(12) United States Patent
Juarez et al.

(10) Patent No.: US 9,825,701 B2
(45) Date of Patent: Nov. 21, 2017

(54) FREE SPACE OPTICAL COMMUNICATION

(71) Applicant: The Johns Hopkins University, Baltimore, MD (US)

(72) Inventors: Juan C. Juarez, Ellicott City, MD (US); Radha A. Venkat, Columbia, MD (US); Ricardo Luna, Columbia, MD (US); David A. Kitchin, Laurel, MD (US); Melissa E. Jansen, Mount Airy, MD (US); David W. Young, Clarksville, MD (US); Katherine T. Souza, Baltimore, MD (US); Joseph E. Sluz, Ellicott City, MD (US); David M. Brown, Ellicott City, MD (US); Ryan P. DiNello-Fass, Mount Airy, MD (US); Hala J. Tomey, Washington, DC (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 14/880,875

(22) Filed: Oct. 12, 2015

(65) Prior Publication Data
US 2016/0112124 A1 Apr. 21, 2016

Related U.S. Application Data

(60) Provisional application No. 62/066,479, filed on Oct. 21, 2014, provisional application No. 62/065,115, filed on Oct. 17, 2014, provisional application No. 62/065,040, filed on Oct. 17, 2014, provisional application No. 62/066,421, filed on Oct. 21, 2014.

(51) Int. Cl.
H04B 10/112 (2013.01)

(52) U.S. Cl.
CPC .................. *H04B 10/112* (2013.01)

(58) Field of Classification Search
CPC ................ H04B 10/112; H04B 10/114
See application file for complete search history.

(56) References Cited

U.S. PATENT DOCUMENTS

2014/0225916 A1* 8/2014 Theimer ............... G06T 19/006
345/633

* cited by examiner

*Primary Examiner* — Leslie Pascal
(74) *Attorney, Agent, or Firm* — Sung T. Kim

(57) ABSTRACT

An optical communications beacon receiver including a camera for capturing a plurality of beacon images. The plurality of beacon images includes a beacon signal transmitted from a beacon transmitter. The beacon receiver also including processing circuitry configured for determining the state of the beacon signal for each of the plurality of beacon images based on the known pattern, at least one beacon image of the plurality of beacon images includes a beacon on state and at least one beacon image of the plurality of beacon images includes a beacon off state, comparing the at least one beacon image including the beacon on state to the at least one beacon image including the beacon off state, and determining a beacon location based on the comparison of the at least one beacon image including the beacon on state to the at least one beacon image including the beacon off state.

20 Claims, 19 Drawing Sheets

FREE SPACE OPTICAL COMMUNICATION

CROSS REFERENCE TO RELATED APPLICATIONS

This application claims the benefit of U.S. Provisional Application No. 62/066,421, filed Oct. 21, 2014, U.S. Provisional Application No. 62/066,479 filed on Oct. 21, 2014, U.S. Provisional Application No. 62/065,115 filed on Oct. 17, 2014, and U.S. Provisional Application No. 62/065,040 filed on Oct. 17, 2014, the entire contents of each are hereby incorporated herein by reference.

TECHNICAL FIELD

Example embodiments generally relate to data communication and, in particular, relate to free space optical communication.

BACKGROUND

Recent advances in free-space optical communications (FSOC) have led to mobile, long distance communication data links at distances exceeding 200 km with data rates of 10 Gbps or greater. However, FSOC data links are highly directional and may require a multi-step pointing, acquisition, and tracking, (PAT) process to establish and/or maintain the data links. In some instances, beacons may be used to guide the pointing of a data beam. A challenge in the PAT process may be beacon acquisition at long distances and/or under challenging weather conditions, such as light haze, bright solar backgrounds, or the like.

FSOC has been increasingly viewed as a potential alternative technology to conventional radio frequency and microwave communications, providing substantially increased data throughput, relief from spectrum planning, and improvements in link security. One of the main challenges in fielding FSOC systems are the deleterious effects introduced by atmospheric turbulence. These include: (1) beam broadening beyond natural diffraction effects as the beam propagates from the transmitter to the receiver, (2) spot blurring and broadening in the focal plane at the receiving aperture with increased turbulence, and (3) intensity fades known as scintillation due to interference effects as a result of the aberrated beam wavefront. Each of these effects introduces substantial link budget penalties for FSOC systems.

BRIEF SUMMARY OF SOME EXAMPLES

Accordingly, some example embodiments may enable the provision of free-space optical communication, as described below. In an example embodiment, an optical communications beacon receiver is provided including a camera for capturing a plurality of beacon images. The plurality of beacon images includes a beacon signal transmitted from a beacon transmitter. The beacon receiver also includes processing circuitry configured for determining the state of the beacon signal for each of the plurality of images based on a known pattern, at least one beacon image of the plurality of beacon images includes a beacon on state and at least one beacon image of the plurality of images includes a beacon off state, comparing the at least one beacon image including the beacon on state to the at least one beacon image including the beacon off state, and determining a beacon location based on the comparison of the at least one beacon image including the beacon on state to the at least one beacon image including the beacon off state.

In another example embodiment, an optical communication system is provided including a beacon transmitter configured to transmit a beacon signal in a known pattern and a beacon receiver including a camera for capturing a plurality of beacon images, and processing circuitry. The processing circuitry may be configured for determining a state of the beacon signal for each of the plurality of images based on a known pattern, wherein at least one beacon image of the plurality of beacon images includes a beacon on state and at least one beacon image of the plurality of beacon images includes a beacon off state, comparing the at least one beacon image including the beacon on state to the at least one beacon image including the beacon off state, and determining a beacon location based on the comparison of the at least one beacon image including the beacon on state to the at least one beacon image including the beacon off state.

BRIEF DESCRIPTION OF THE SEVERAL VIEWS OF THE DRAWING(S)

Having thus described the a FSOC system in general terms, reference will now be made to the accompanying drawings, which are not necessarily drawn to scale, and wherein:

DETAILED DESCRIPTION

Figure 1A:
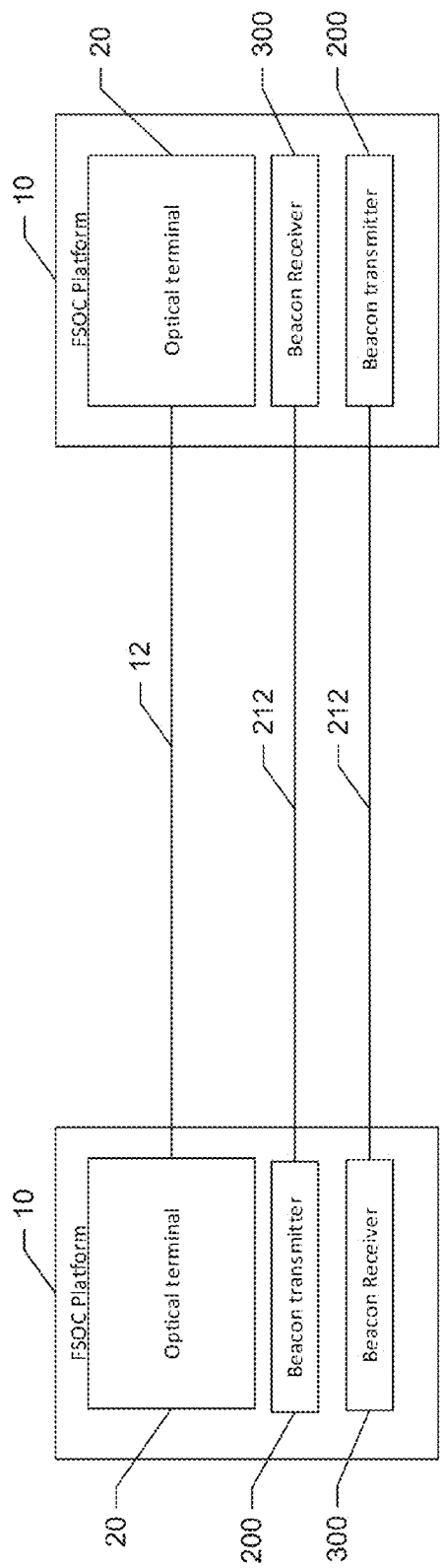
FIG. 1A illustrates an example FSOC system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As used in herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

In some example embodiments, an optical communication system may include a beacon transmitter which transmits a beacon signal in a known pattern. As used herein a beacon pattern refers modulation of a light transmission. An optical communications beacon receiver may capture a plurality of beacon images including the beacon signal transmitted from the beacon transmitter. The beacon receiver may determine the beacon state, e.g. on or off, for each image based on the known beacon pattern and compare one or more images with a beacon off state with one or more images with a beacon off state. The beacon receiver may determine the beacon location based on the comparison of the images and, in some embodiments, steer an optical sensor to align with a data beam based on the beacon location. The comparison of the beacon state may provide for detection of the beacon in light haze, bright solar backgrounds, or other challenging weather conditions.

In some embodiments, the beacon receiver may determine a potential beacon signals from the plurality of beacon images by comparing beacon image pixels to neighboring pixels. The comparison may include the intensity of the pixels to differentiate potential beacon pixels from background.

In some example embodiments, the beacon receiver may eliminate potential beacon signals from further analysis. In an example embodiment, the beacon receiver may register the plurality of beacon images and exclude potential beacons which change location. In some example embodiments, the beacon receiver may be synchronized with the beacon pattern of the beacon transmitter and exclude potential beacon signals which the do not match the synchronized beacon pattern. In an example embodiment, the beacon pattern may include a repetitive cycle including a start pattern indicator. The beacon receiver may exclude potential beacon signals which do not match the beacon state of the beacon pattern based on the start pattern indicator. The elimination of potential beacons may provide for faster and more accurate pointing acquisition and tracking of the beacon signal to establish the data link.

In some example embodiments the, the beacon receiver may reduce the background light by utilizing a polarization filter for linear polarization and a quarter wave plate for circular polarization. The reduction of background light may allow for capture of beacon images with significantly less light noise.

Example Free Space Optical Communication System

FIG. 1A illustrates a FSOC system according to an example embodiment. The FSOC system may include two FSOC platforms 10. Each of the FSOC platforms 10 may include an optical terminal 20 for sending and receiving data through an optical communication data link, e.g. data link 12. The data link 12 may be a data modulated light beam. The data link 12 transmitted by an optical terminal 20 of one of the FSOC platforms 10 may be received by an optical terminal in another one of the FSOC platforms 10. The data link may be properly acquired using a beacon signal 212. The beacon signal 212 may be transmitted by a beacon transmitter 200 of at least one of the FSOC platforms 10. A beacon receiver 300 in another of the FSOC platforms 10 may point at the location of the beacon signal 212, acquire the beacon signal 212, and track the beacon signal 212, e.g. maintain alignment or aim, to establish and maintain the data link 12. The PAT process of the beacon transmitter 200 and beacon receiver 300 is described below in reference to FIGS. 1B through 8. An example optical terminal is described in reference to FIGS. 9-16.

Example Pointing, Acquisition, and Tracking Process

Figure 1B:
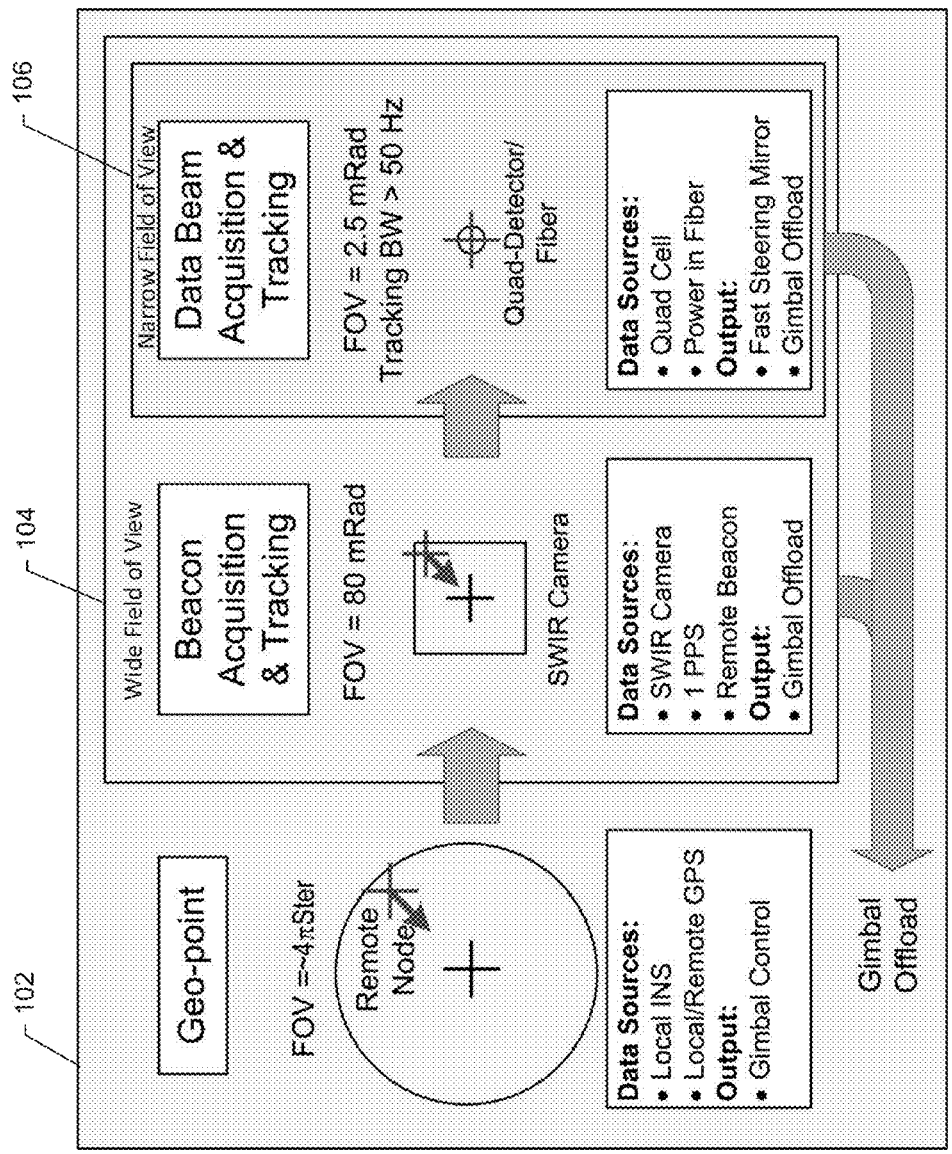
FIG. 1B illustrates a PAT process according to an example embodiment.

An example embodiment of the PAT process will now be described in reference to FIG. 1B. A data link 12 may be established using a PAT process. The PAT process may commence at geo-pointing 102. Geo-pointing 102 may include a coarse pointing of the two FSOC platforms 10 based on geographic coordinates, such as inertial navigation system (INS) coordinates, local global positioning system (GPS) coordinates, and/or remote GPS coordinates. The geographic coordinates may be exchanged between the FSOC platforms 10, such as by radio frequency (RF) communications. The field of view (FOV) for geo-pointing 102 may be 2πSter, 4πSter, or other FOV size. The geographic coordinates may be used by a targeting system, such as a gimbaled targeting system, to point the at least one of the FSOC platforms 10 in the general direction of another of the FSOC platforms 10. A beacon signal 212 transmitted from a beacon transmitter 200 may be within the FOV of the beacon receiver 300 of one of the FSOC platforms 10 at wide FOV beacon signal acquisition and tracking 104.

The beacon signal 212 may be light modulated in a predetermined beacon pattern. The beacon receiver 300 may have a camera 70 having a FOV of about 5-80 mRad to capture a plurality of images including the beacon signal 212. The beacon receiver 300 may determine the location of the beacon signal 212, as discussed below. The determined location of the beacon signal 212 may be used to guide pointing of the data link 12 beam in a narrow FOV data beam acquisition and tracking 106.

Upon locking onto the beacon signal 212, in the narrow FOV data link 12 beam acquisition and tracking 106, the narrow beam is steered by a fast, narrow FOV element, such as a fast steering mirror or adaptive optics system. A sensing element such as a quad-cell, position sensor, or wave-front sensor with a similar field of view as the data beam steering element locates and tracks the data link 12 beam. In an example embodiment, the FOV of the narrow data link 12 beam may be about 200 μRad. The tracking bandwidth (BW) may be greater than about 50 Hz. Upon active tracking of the data link 12 beam, the acquisition of the FSOC link is complete and useful data transfer can be initiated between the optical communication platforms.

Locating an IR target such as the beacon signal 212 from the beacon images captured by the camera 70 may be challenging in many conditions as the beacon signal 212 may be buried in the background clutter resulting in a low signal-to-noise ratio (SNR). In some examples the brightness of the target, e.g. beacon signal 212, may be lower than that of many features in collected beacon images making simple thresholding schemes ineffective. To improve the beacon signal 212 SNR, background subtraction can be utilized by comparing a beacon image captured while the beacon signal 212 was in a beacon on state to an image captured within a short time-frame with the beacon signal 212 in a beacon off state. The beacon transmitter 200 and beacon receiver 300 architectures are discussed below in reference to FIGS. 2 and 3, respectively.

Figure 2:
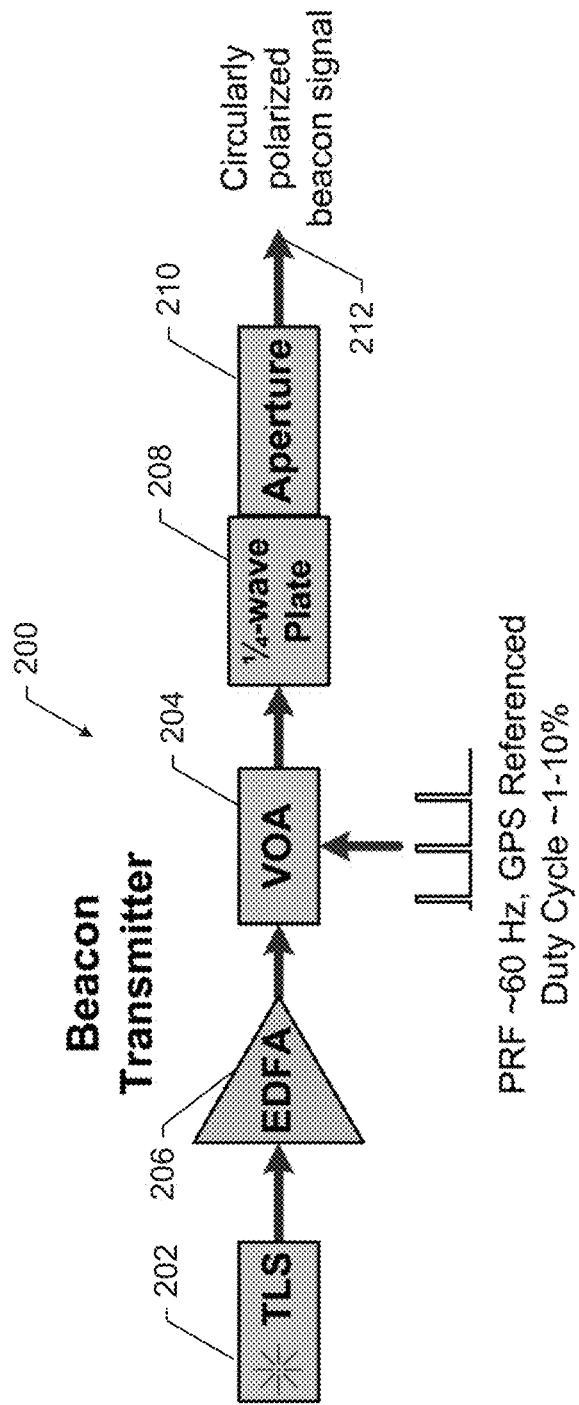
FIG. 2 illustrates an example beacon transmitter according to an example embodiment.

FIG. 2 illustrates an example beacon transmitter 200 according to an example embodiment. The beacon transmitter 200 may include a light source 202, a modulator 204, and an optical amplifier 206. The light source 202 may be a laser, such as a tunable laser source (TLS). In some example embodiments, the TLS may transmit light at a wavelength range of about 1530-1565 nm. The light source 202 may be operably coupled to the optical amplifier 206. The light may be amplified by the optical amplifier 206. The optical amplifier 206, in some example embodiments, may be an erbium doped fiber amplifier (EDFA). The optical amplifier 206 may be operably coupled to the modulator 204. In an example embodiment, the modulator 204 may be a variable optical attenuator (VOA). The modulator 204 may modulate the amplified light in the beacon pattern such that the beacon signal 212 is modulated at a predetermined frequency, such as 60 Hz, 120 Hz, or the like, with a low-duty cycle ranging from 1-10%. Higher modulation frequencies may reduce image shifts between beacon images. The modulation may be referenced to a clock, such as a GPS 1 pulse per second (PPS) reference, as discussed below in reference to FIG. 4. An example beacon pattern is discussed below in reference to FIG. 5. The modulated light may be transmitted as the beacon signal 212 through an aperture 210.

In an example embodiment, the light may be modulated by the modulator 204 prior to amplification by the optical amplifier 206.

In an example embodiment, the beacon transmitter 200 may include a polarizer 208, such as a linear polarizer, and/or a circular polarizer. In some example embodiments the polarizer 208 may include a quarter wave plate for converting linear polarized light to circular polarized light, as discussed in reference to FIG. 8.

Figure 3:
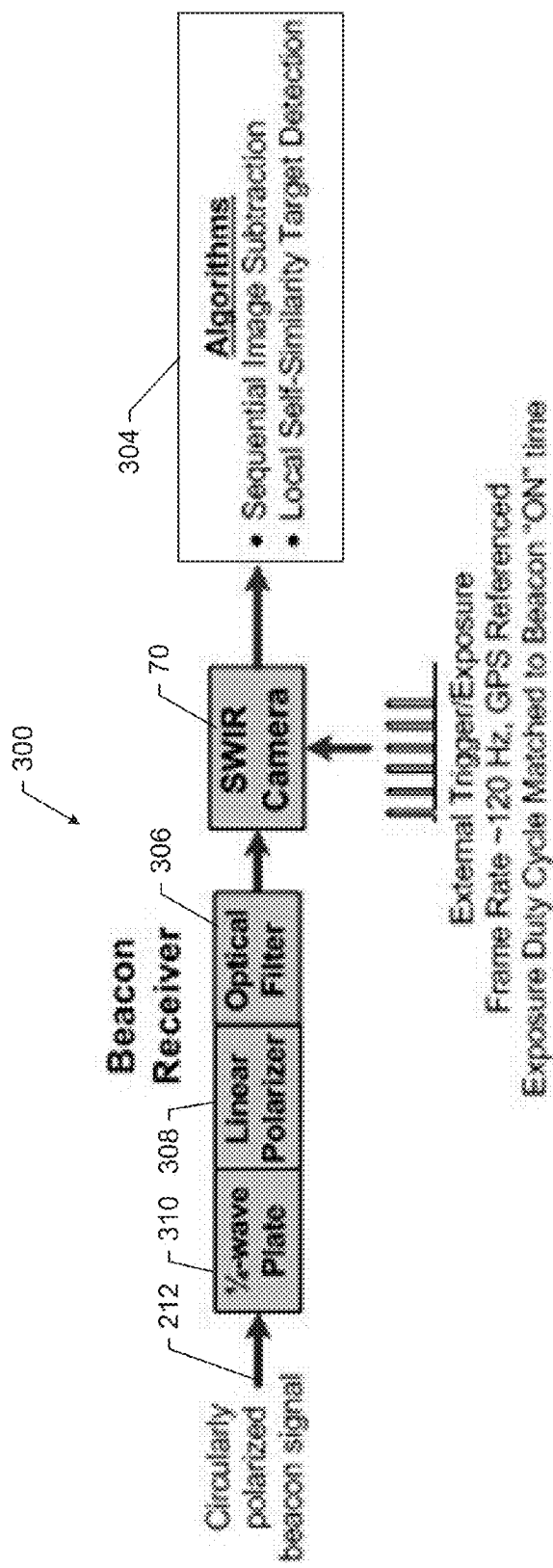
FIG. 3 illustrates an example beacon receiver according to an example embodiment.

FIG. 3 illustrates an example beacon receiver 300 according to an example embodiment. The beacon receiver 300 may include the camera 70 and processing circuitry, such as processing circuitry 50 discussed in reference to FIG. 17. In an example embodiment, the camera 70 may be a photo detector, a digital camera or the like, such as a short wave infrared (SWIR) camera. The camera 70 may capture a plurality of beacon images including the transmitted beacon signal 212. The camera 70 may send the captured images to the processing circuitry 50 for analysis.

In an example embodiment, the camera 70 may be triggered to capture beacon images at twice the modulation frequency of the beacon signal 212 and phased so that alternating beacon images contain the beacon signal 212 in the beacon on state and beacon off state. The integration time of the camera 70 for both the beacon on state and beacon off state may be set to be equal or less than the beacon on state time to ensure that beacon images captured during the beacon on state only capture while the beacon signal 212 is in the beacon on state and thus maximize SNR. Beacon images captured during the beacon off state may be set to the same integration time as the beacon on state so that the background levels of the sequential beacon images are similar.

Image similarity between the beacon image including a beacon signal 212 in the beacon on state and the beacon image including the beacon signal 212 in the beacon off state may be used to determine a relative camera motion between the two beacon images by registering the beacon images, such as by using a phase correlation image processing algorithm. The phase correlation image processing algorithm may use a fast frequency-domain approach to estimate the relative transitive offset between two sequential beacon images. For example, the phase correlation imaging processing may utilize discrete 2D Fourier transforms to find the relative phase shift between beacon images with sub-pixel resolution, then translate that shift to a (Δx,Δy) pair. The (Δx,Δy) pair may be used to shift the first of the sequential beacon images by a numerical method, such as applying an affine transform.

In an example embodiment in which insufficient image detail is available, such as a uniform sky, to make a reliable registration, the phase correlation image processing may not be performed.

Sequential post-registration beacon images in the beacon on state and beacon off state may be subtracted to enhance the contrast of the beacon signal 212 to its surroundings. For example, if the current beacon image is beacon on state, the previous beacon image including beacon off state is subtracted from it; if the current beacon image includes the beacon off state, it is subtracted from the previous beacon image, which includes the beacon on state.

To maximize the effectiveness of the background subtraction approach, a synchronization method may be implemented. The synchronization method may allow the beacon receiver 300 to know which beacon images were captured during the beacon on state and the beacon off state. In an example embodiment, a reference signal available to both the beacon transmitter 200 and beacon receiver 300, even when separated by tens to hundreds of kilometers may be utilized. The reference signal may be, for example, a GPS reference pulse. The GPS reference pulse may be a one pulse per second (1PPS) reference pulse. Additionally or alternatively, a high accuracy clock, such as an atomic clock may be used as the reference signal. In GPS denied environments, a very stable oscillator within the clock source may be utilized to maintain synchronization between the beacon transmitter 200 and beacon receiver 300 after the loss of GPS signals in either or both ends of the data link 12.

Figure 4:
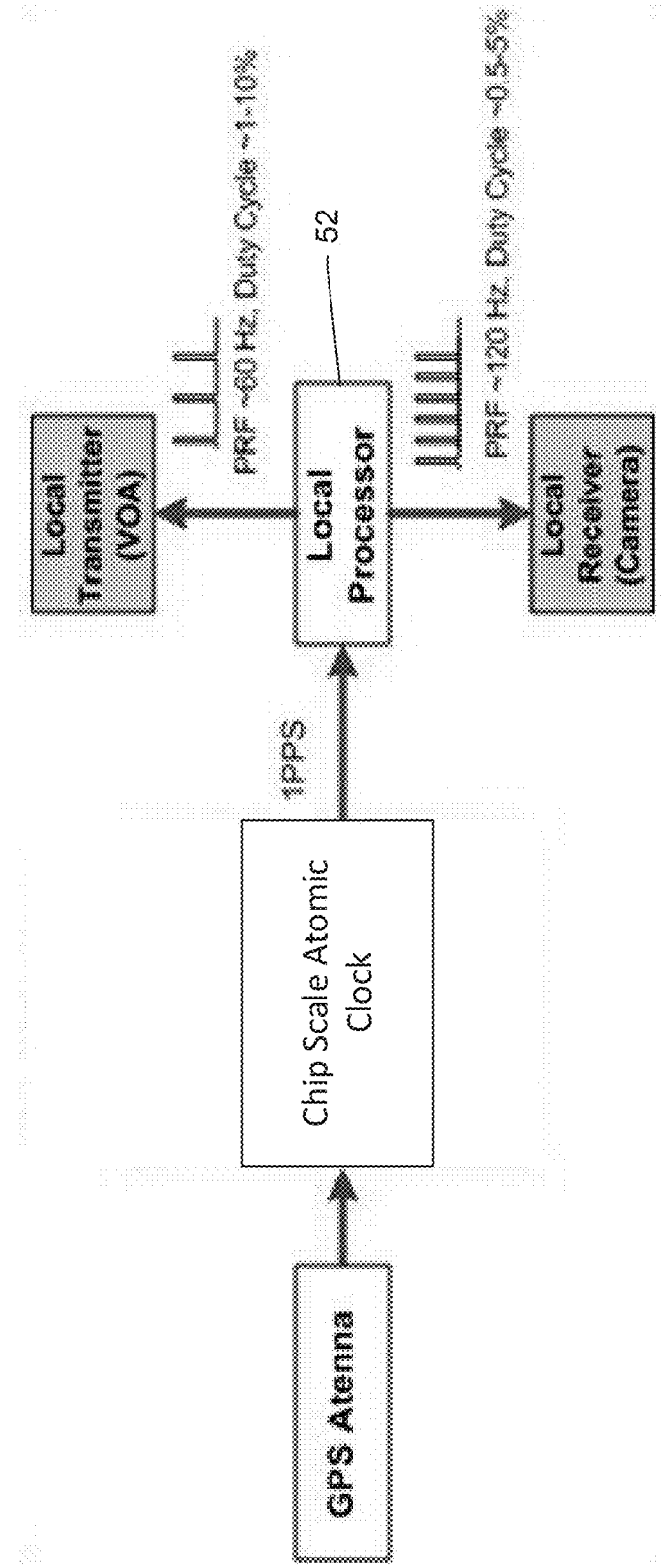
FIG. 4 illustrates an example beacon synchronization according to an example embodiment.

FIG. 4 illustrates an example beacon synchronization according to an example embodiment. In an example embodiment, a GPS antenna may use a received GPS time to drive a chip scale atomic clock 1PPS. The 1 PPS reference signal may be fed to processing circuitry 50 to generate the beacon image capture and beacon pattern waveforms as illustrated in FIG. 4. In an example embodiment of the beacon transmitter 200, the 1PPS reference signal causes the processing circuitry 50 to trigger the modulation beacon pattern waveform to drive the VOA 204 in the beacon transmitter 200 for the beacon signal 212 transmission. In an example embodiment of the beacon receiver 200, the 1PPS reference signal causes the processing circuitry 50 to control the image capture and exposure time of the camera 70 for locating the beacon signal 212.

Known time delays between the beacon transmitter 200 and beacon receiver 300 for the travel time of the beacon signal 212 may be corrected by the processing circuitry 50, by adjusting the phase between the beacon image capture and beacon pattern waveforms. In addition, the modulation frequency and duty cycle for the beacon image capture and beacon pattern waveforms may be adjusted based on the desired performance characteristics.

Figure 5:
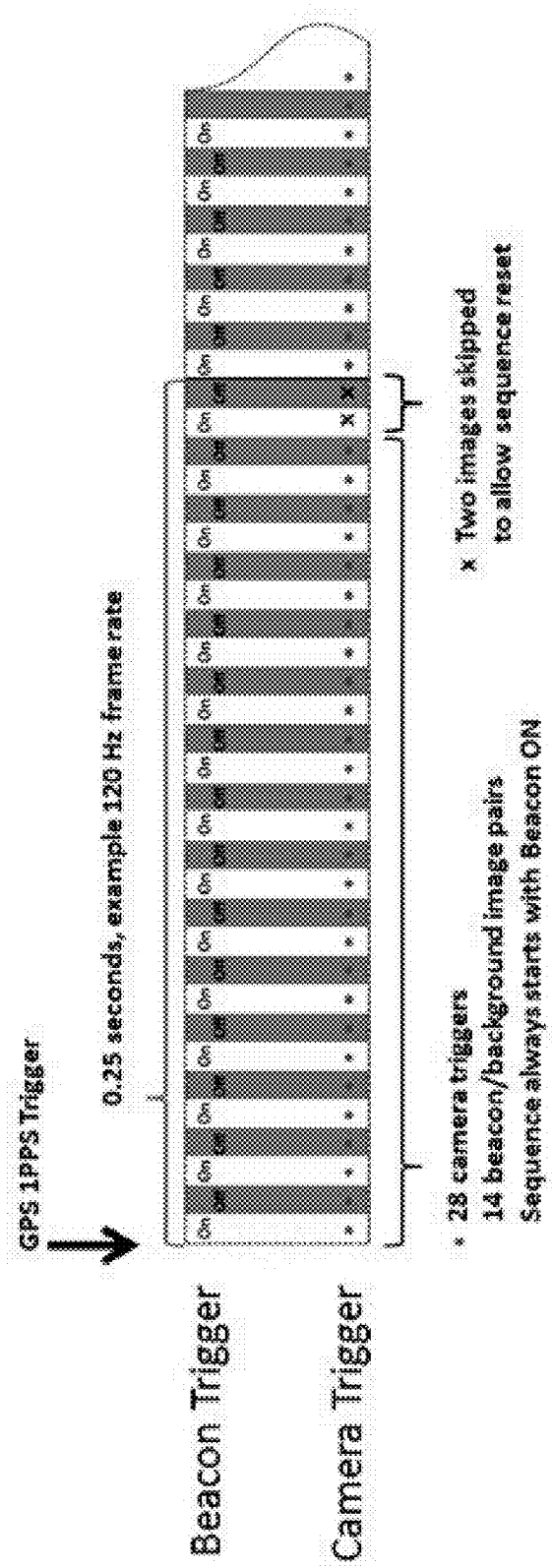
FIG. 5 illustrates an example beacon pattern according to an example embodiment.

Streams of beacon images may be captured and processed by the respective beacon receivers 300 of the FSOC platforms 10. To address the uncertainty of which beacon images include the beacon on state and which beacon images include the beacon off state, each of the beacon images may be time tagged. The time tag for each beacon image may be associated with the beacon pattern, which may be synchronized as discussed above. Additionally or alternatively, the beacon pattern may be a repetitive pattern cycle. For example, as illustrated in FIG. 5, if the beacon signal 212 is modulated at 60 Hz and the camera 70 is capturing beacon images at 120 Hz, a series of beacon images can be captured with purposeful gaps of two or more images between capture sequences. Sequences of N images (e.g. 28) every (N+2)/120 seconds (e.g. 0.25 seconds) can then be processed with the time stamp gap between sequences providing a start pattern indicator. The start pattern indicator may be indicative of the start of the beacon pattern cycle and therefore the beacon on states and beacon off states of the beacon pattern. In other words, the gap in time between pattern cycles, observable by the time stamp assigned to each beacon image, can then be used as a marker to identify the beacon state assignment of other beacon images.

Figure 6:
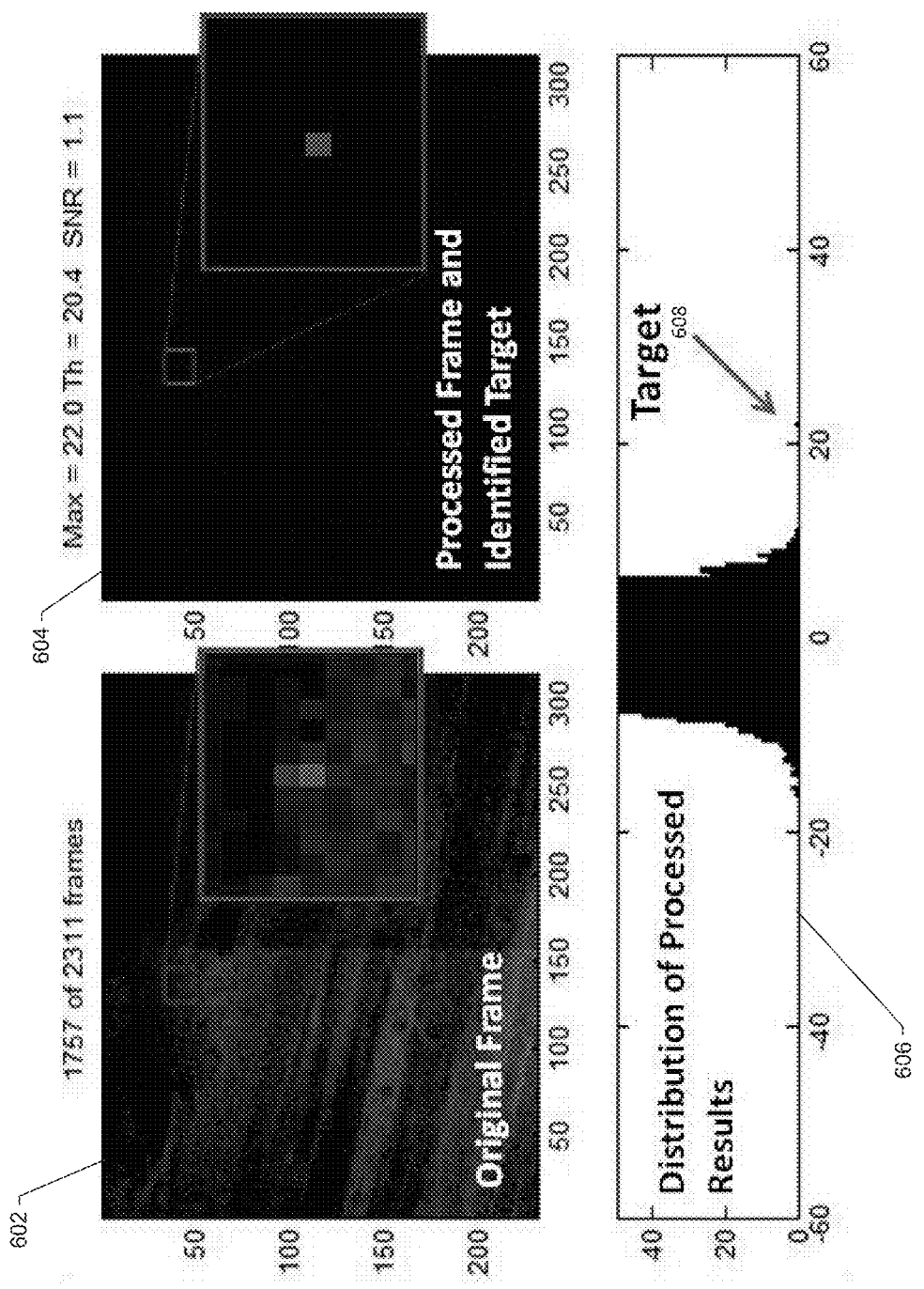
FIG. 6 illustrates an example beacon image processing according to an example embodiment.

FIG. 6 illustrates an example beacon image processing according to an example embodiment. Single beacon image beacon detection enhancement may be achieved through local background analysis since the beacon image background may vary significantly from region to region. The top left frame 602 shows the beacon image of a desert ground site taken from an airplane at a range of 90 km and elevation of ~15,000 ft along with the beacon region zoomed in. The upper right frame 604 depicts the resultant beacon image after the original beacon image has been processed to enhance the small, dim beacon by a low-complexity, local self-similarity algorithm.

The self similarity algorithm may be used to enhance the beacon signal in the beacon image by comparing each pixel in the beacon image to the pixels around it. In this example embodiment, for each pixel location, an error magnitude is generated by summing the square of the differences between the reference pixels and the pixels around it. To determine whether the reference pixel is brighter or darker than its surroundings, the differences between the reference pixels and the surrounding 8 pixels are summed to generate a signed value. An error value is generated by multiplying the error magnitude to the signed value. The error values for each pixel are then centered about zero as half the time the reference pixels will be darker than its surroundings and the other half the time the reference pixels will be brighter than their surroundings. In the present example, plot 606 shows a histogram of the error values centered about zero.

Since the beacon signal 212 is expected to be brighter than its surroundings, e.g. background, only those error values significantly greater than zero may be considered as potential beacon locations. Different criteria may be used to declare a particular pixel location as a beacon location 608. The background analysis may include a goal of maximizing positive beacon location "hits", while minimizing false alarms. As an example, a metric depending on the standard deviation may be used to identify, e.g. determine, the beacon location 608.

Additionally or alternatively, a larger number of surrounding pixels (e.g. >8 pixels) may be analyzed around one or more reference pixels depending on the expected beacon size, based on distance from the beacon transmitter 200 and or resolution of the beacon image. In an example embodiment, the beacon receiver 300 may determine a beacon size for one or more of the potential beacon signals. The beacon sizes of the potential beacon signals may be compared to a beacon size threshold. The beacon size threshold may include a minimum and/or maximum number of pixels which the potential beacon signal may be considered for analysis, for example greater than 1 pixel but less than 8 pixels. Potential beacon signals which fail to satisfy the beacon size threshold may be excluded from further analysis. Additionally or alternatively, other algorithms for enhancing the contrast between the transmitted beacon and background may also be implemented including comparing pixels to the average background, median background, or by a ratio. Applying these feature constraints may aid in identifying the object or objects in the beacon image with reasonable probability of being the beacon signal 212.

In another example embodiment, the beacon receiver 300 may determine if a potential beacon signal has changed positions. The beacon receiver 300 may register the beacon images, based on a geographic coordinates. In an example embodiment, the beacon image may include geographic coordinates for each pixel in the beacon image. In other examples one or more pixels may be associated with a geographic coordinate, e.g. reference pixels, and the geographic coordinates of the remaining pixels may be interpolated. Registration of the beacon images may include associating pixels of a first beacon image with pixels of the second beacon image based on the geographic coordinates of each pixel. In an instance in which the potential beacon signal changes location based on the registered beacon images, the potential beacon signal may be excluded form further analysis.

In some example embodiments, the beacon receiver 300 may compare a potential beacon state to an expected beacon state of the beacon image based on the association of the beacon state with the beacon images. As discussed above the associated beacon state of the beacon images may be based on the synchronized beacon pattern and/or the start pattern indicator. In an instance in which the potential beacon state fails to match the expected beacon state associated with the beacon image, the potential beacon signal may be excluded from further analysis.

Referring back to FIG. 3, the beacon receiver 300 may also include an optical filter 306 and/or linear polarizer 308 to reduce background light in the captured beacon images. The optical filter 306 may be a wavelength filter configured to pass light in the wavelength or wavelength range of the beacon signal 212 and reject light outside of the wavelength or wavelength range of the beacon signal 212. The linear polarizer 308 may be aligned with the polarization of the beacon signal 212. The linear polarizer 308 may pass light in the polarization of the beacon signal 212 and reject light not aligned with the polarization of the beacon signal 212.

In an example embodiment, the beacon receiver 300 may include a quarter wave plate 310. The quarter wave plate 310 may convert a circularly polarized light into linearly polarized light. Circular polarization filtering is discussed below in reference to FIG. 8.

Figure 7:
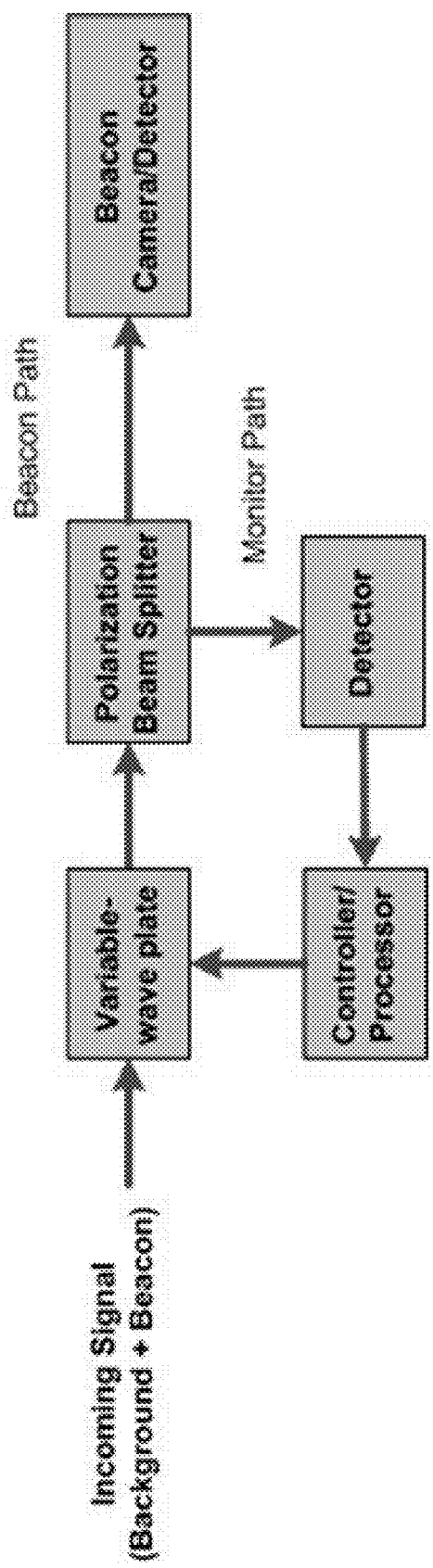
FIG. 7 illustrates beacon signal filtering according to an example embodiment.

FIG. 7 illustrates beacon signal filtering according to an example embodiment. Polarization filtering may reduce background light in the captured beacon images. The polarization filtering may rejected half of the unpolarized background light, e.g. noise, and reject linearly polarized specular reflections, such as glare off car windshields, which may appear as a potential beacon signal in a beacon image. In an example embodiment, the beacon transmitter 200 transmits the beacon signal 212 with a purely linear polarization. A polarization beam splitter (PBS) may be used by the beacon receiver 300 to separate the desired beacon signal 212 signal from background in the orthogonal polarization.

In an example embodiment, the FSOC platforms 10 may be deployed on mobile platforms, the polarization of the transmitted beacon signal 212 must be aligned to the polarization reaching the camera 70. In some example embodiments, the polarization alignment is controlled by the beacon receiver 300, as depicted in FIG. 7. The orthogonal polarization is monitored with a separate detector whose output is fed to a controller, such as processing circuitry 50, to determine a correction for a variable wave plate ahead of the PBS. This may be achieved by minimizing the signal on a monitor channel and thus maximizing the signal level of the beacon signal 212 signal level on the camera 70. In some example embodiments, the beacon transmitter 200 and beacon receiver 300 may be configured to transmit and receive on a vertical polarization relative to the horizon to maximize filtering out of background glares from the sun that are predominantly on the horizontal direction.

For FSOC systems that leverage gimbals, such as the Wescam MX-15i, the polarization filtering method may be simplified to only have a linear polarizer ahead of the camera 70. In this example embodiment, the gimbal may include control loops which keep a frame of reference constant, so that the beacon images remain level, e.g. level with the horizon. Therefore, the gimbal may maintain an image rotation reference that may be leveraged for polarization filtering. As in the case above, the transmit and receive polarization may be aligned vertical relative to the horizon to maximize filtering of background glares from the sun.

Figure 8:
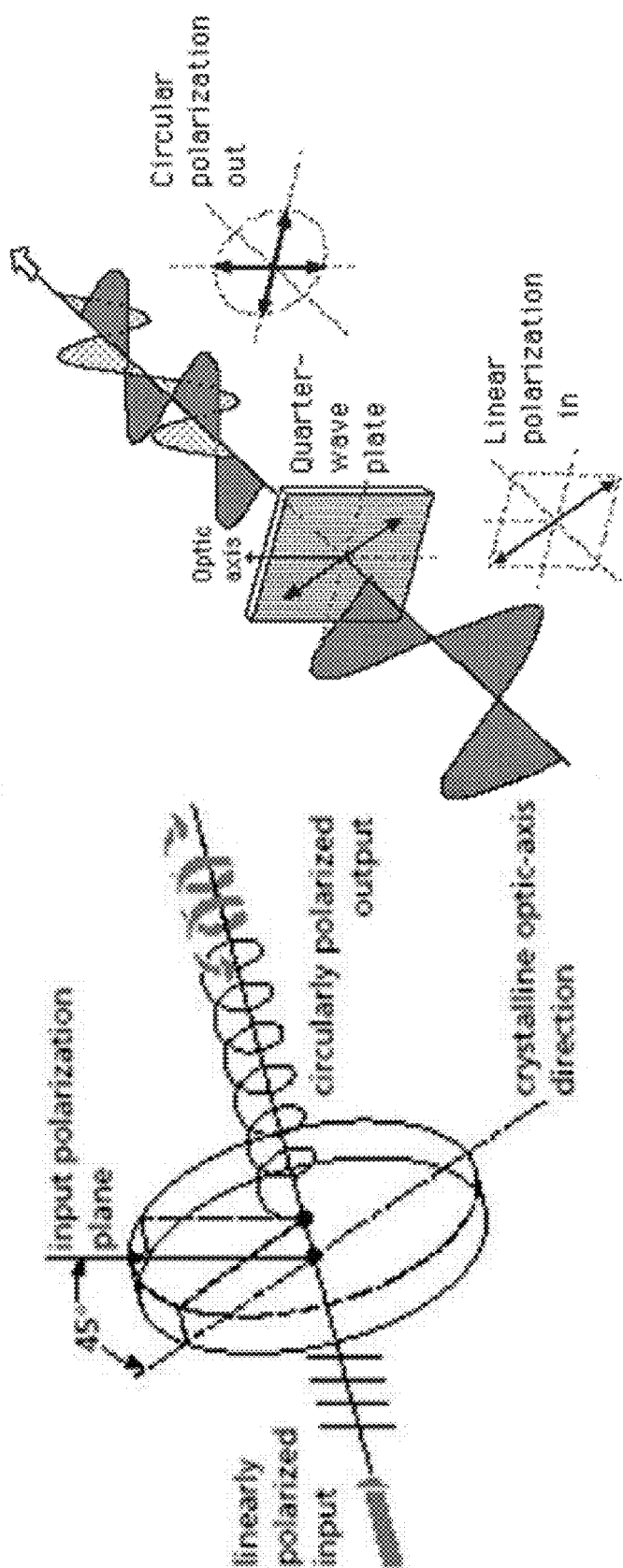
FIG. 8 illustrates an example conversion of linear polarized light to circular polarized light according to an example embodiment.

Additionally or alternatively, circular polarization may be utilized to eliminate active transmit/receive control of the polarization direction for mobile optical communication system applications that may not maintain a reference relative to earth. As discussed above in reference to FIG. 2, the polarizer 208 of the beacon transmitter 200 may include a quarter-wave plate. The quarter wave plate may be aligned at 45 degrees to the light source's, e.g. laser's, linearly polarized output to converts the linear polarized output into circularly polarized light as illustrated in FIG. 8. The quarter-wave plate may convert the linearly polarized light into circularly polarized light by retarding one axis of the light relative an orthogonal axis. Depending on the alignment (+45 vs. −45 degrees), the output can be set up to have right-hand or left-hand circularly polarized light.

As discussed above in reference to FIG. 3, the beacon receiver 300 may include the quarter-wave plate 310. The quarter wave plate 310 may convert the incoming circularly polarized light into linearly polarized light regardless of the rotational orientation between beacon transmitter 200 and beacon receiver 300. By setting the linear polarizer 308 at the appropriate offset of +45 or −45 degrees to the optical axis of the quarter wave plate 310 depending on whether right-hand or left-hand circularly polarized light is expected, the incoming beacon signal 212 is passed, while background light is rejected. Since the alignments of the optical elements in both the beacon transmitter 200 and beacon receiver 300 may be set during the build process, no active control is required during system operation.

The level of background and glint rejection for both linear and circular polarization filtering may vary depending on the kind of polarization (unpolarized vs. polarized) and relative angle to the linear polarizer 308 in the beacon receiver 300. In an example embodiment, for general unpolarized background light, polarization filtering may remove half (3 dB) of the background light, e.g. noise.

Example Multi-Aperture Optical Terminal for FSOC

The following section is directed toward a multi-aperture optical terminal 20 for a FSOC platform once the optical communication link has been established, such as by using the PAT process described above. In an example embodiment, the optical terminal 20 may provide an optical gain with a configuration that is simpler and lower cost than current adaptive optic systems. The optical terminal 20 configuration provided may reduce the cost/complexity along with the size, weight, and power (SWAP) requirements of the optical terminal 20 (i.e. optical antenna) while maintaining a high degree of performance. The architecture of the optical terminal 20, specifically a multi-aperture configuration, leverages spatial diversity to provide gain to help offset losses experienced from atmospheric scintillation.

Figure 9:
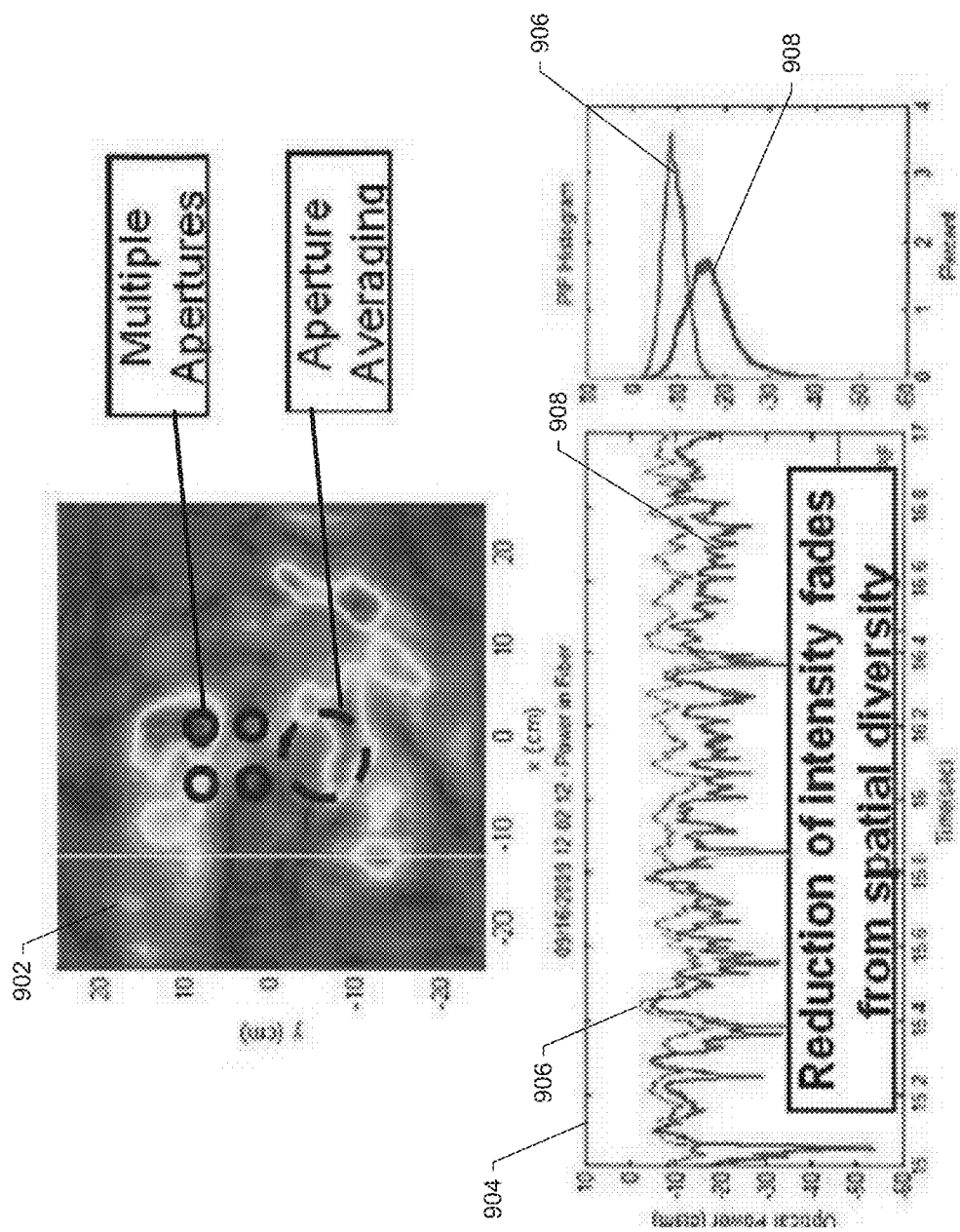
FIG. 9 illustrates a comparison of a multi aperture system and a single aperture system according to example embodiments.

FIG. 9 illustrates a comparison of a multi-aperture system and a single aperture system according to example embodiments. Received power from a single 4-inch aperture system is compared to a four aperture system with 1-inch apertures. A light intensity map 902 illustrates how distributed apertures improve the probability of capturing light as compared to a single larger aperture due to the aberrated nature of the optical wave front at the optical terminal 20 after propagation through turbulence. Chart 904 shows the temporal plots and histograms of received power for both approaches. Spatial diversity (grey plot 906) results in a much tighter received power distribution as compared to the single aperture system (black plot 908).

One challenge of an optical terminal with multiple receiving apertures may be combining the incoming signals from the different apertures. In an example embodiment, the incoming signals, e.g. data link 12, of two apertures may be passively combined with low optical loss and independent of terminal orientation relative to the horizon. The passive combining of the incoming signals may be achieved through the incoherent superposition of orthogonal polarization states inside the optical terminal 20. In some example embodiments, the passive combining process may be extended to four or more apertures by including active polarization/phase control elements.

Figure 10:
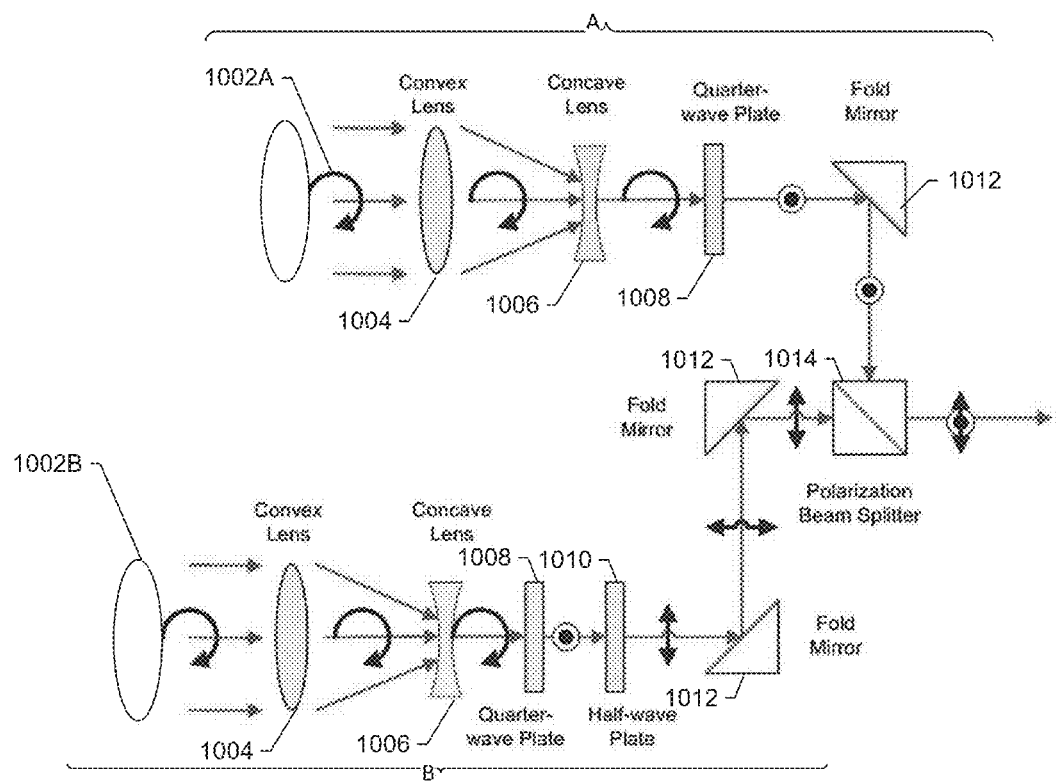
FIG. 10 illustrates a passive, incoherent beam combination refractive terminal approach according to an example embodiment.

FIG. 10 illustrates a passive, incoherent beam combination refractive terminal approach according to an example embodiment. The circularly polarized (e.g. right-handed polarization) incoming beam, e.g. data link 12, may be captured by both apertures 1002A, 1002B. The beam may be focused on by convex lens 1004 and concave lens 1006 to the quarter wave plate 1008. The quarter wave plate 1008 in each beam path may convert the incoming circularly polarized light into linearly polarized light (as indicated by the circular and straight arrows) regardless of the rotational orientation between the optical terminals 20. The conversion of the data link 12 beam from linear polarization to circular polarization may be substantially similar to the conversion of the beacon signal 212 from linear to circular polarization, as discussed above in reference to FIG. 8. By setting the linear polarizer at the appropriate offset of +45 or −45 degrees to the optical axis of the quarter wave plate 1008 depending on whether right-hand or left-hand circularly polarized light is expected, the incoming beacon signal may be passed while background is rejected. Since the alignments of the optical elements in both optical terminals 20 may be set during the build process, no active control is required during system operation. In one beam path (bottom in this case) a half-wave plate 1010 may be used to rotate the linear polarization state by 90 degrees. The two beam paths may be aimed toward a polarization beam combiner 1014 via folding mirrors 1012. The two beam paths may be combined with a polarization beam combiner 1014 that superimposes the orthogonal polarization states. The combined output may then be sent to other optical terminal elements, such as a fast steering mirror and position sensing detector system for tracking and steering and a fiber, such as a single mode fiber (SMF) or a multi-mode fiber (MMF), for capturing the light.

Figure 11:
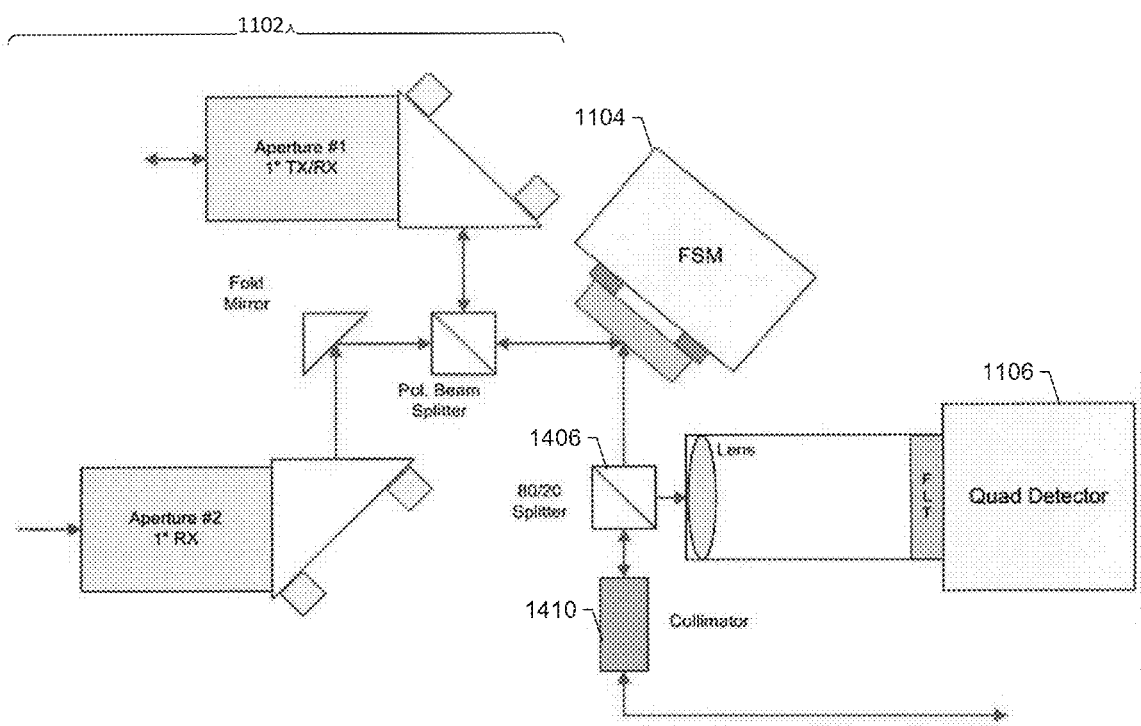
FIG. 11 illustrates mono static refractive terminal design with two-aperture combining according to an example embodiment.
Figure 12:
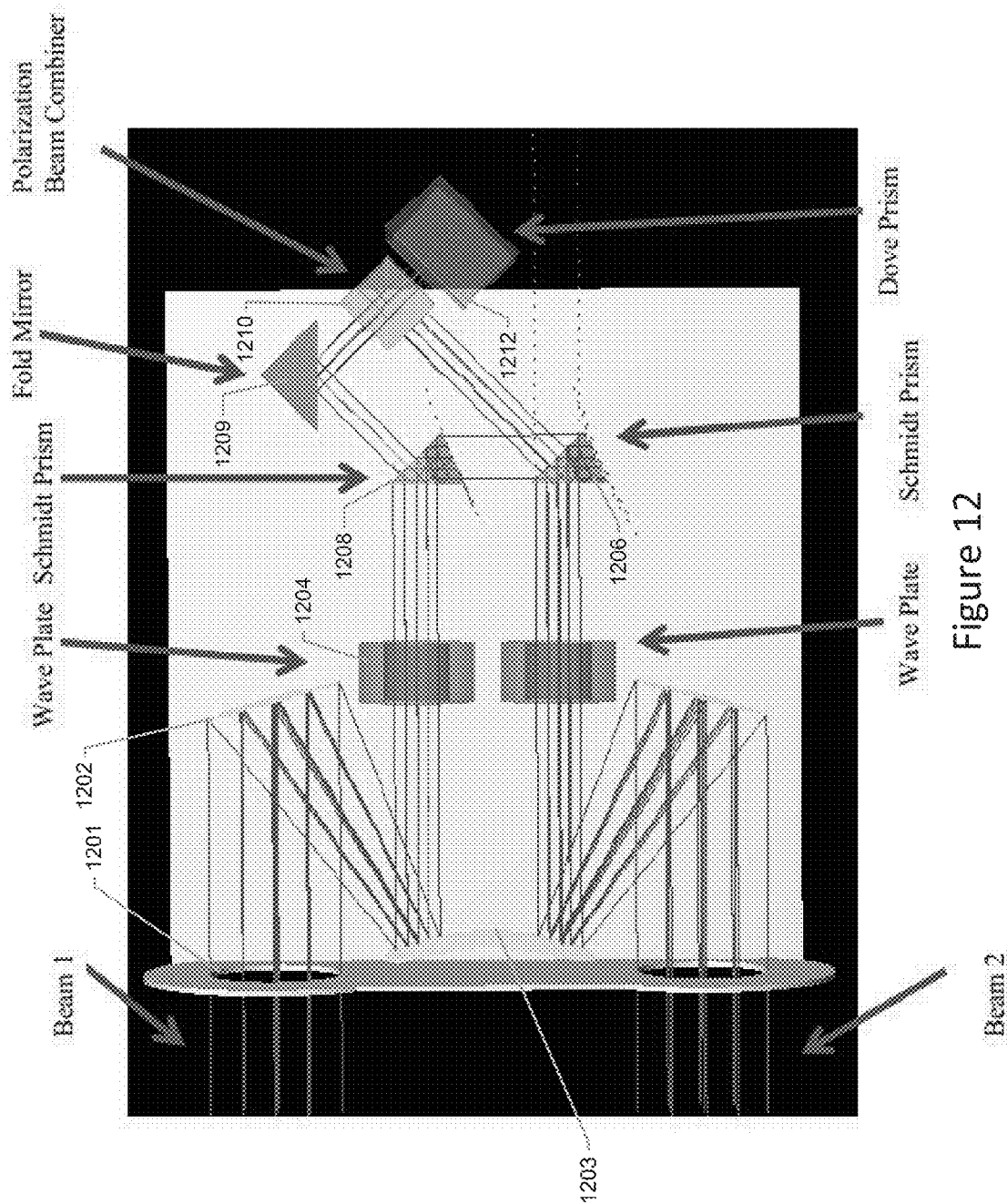
FIG. 12 illustrates a two-aperture optical terminal receiver with reflective design according to an example embodiment.

The refractive optical front end 1102 design of the optical terminal 20, illustrated in FIG. 10, may be used for a monostatic system to simultaneously transmit and receive as illustrated in FIG. 11. The combined output from the optical front end 1102 is routed to a fast steering mirror (FSM) 1104, then split between an optical transmit/receive fiber and a quadrant detector. The FSM 1104 and quadrant detector 1106 may be used with a feedback control loop for tracking and steering the incoming beam onto the transmit/receive fiber.

In an example embodiment, by controlling the polarization state of linearly polarized outgoing signal, the desired aperture can be selected for transmitting the beam, e.g. data link 12. For example, if the horizontal polarization is output from the transmit/receive fiber, the transmit signal would follow the upper beam path A of optical front end as depicted in FIG. 10 and emanate from the upper aperture 1002A. Alternatively, if the vertical polarization is chosen, the output would follow the upper beam path B and emanate from the lower aperture 1002B.

The two aperture optical terminal 20 design may also be implemented with a reflective design, as illustrated in FIG. 5. In order to ensure a compact design, the diameter of each received beam is reduced by an afocal telescope composed of 2 off-axis parabolic (OAP) mirrors 1202 and a convex parabolic mirror 1203. A reflective parabolic design may eliminate spherical aberration and achieve diffraction limited performance when aligned properly, which may be beneficial over other designs, such as a refractive design. Additionally, the refractive design may be off-axis in nature in order to fold in the design and thus maximize efficient use of space. The relative phases of the beams may be kept equal by utilizing beam path lengths that are the same.

Once the beam diameters are reduced by the OAP mirrors 1202, the beams travel through wave plates 1204 to orients the beam polarization perpendicular to one another so that the beams may be efficiently combined by a polarization beam combiner 1210. The beams may be directed from the wave plates 1204 to the beam combiner 1210 by Schmidt prisms 1208 and a fold mirror 1209. The combined beam may be directed from the polarization beam combiner 1210 to the dove prism 1212.

Once the beams are folded over by the dove prism 1212, the beams are reflected off of a fast steering mirror (FSM) 1104 into non-polarizing beam splitter 1406. This second beam splitter transmits the majority of the energy into a position sensing quadrant detector 1106 and transmits the rest of the energy into an OAP fiber collimator 1410. The quadrant detector 1106 can then be used in a feedback loop with the FSM 1104 to align the beam onto the SMF.

Figure 13:
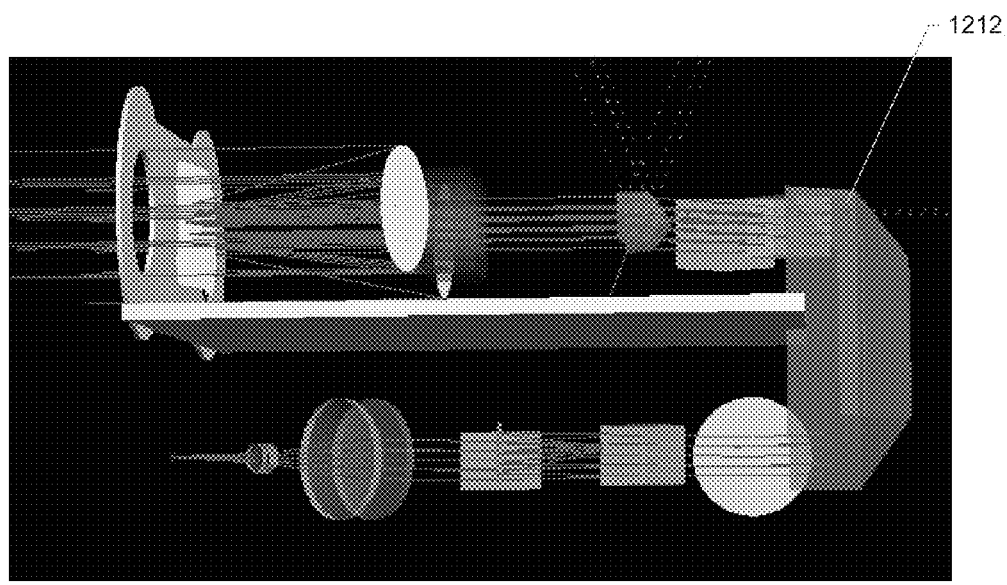
FIG. 13 illustrates a side view of the bottom level optical terminal according to an example embodiment.

FIG. 13 illustrates a side view of the bottom level optical design according to an example embodiment. In an example embodiment, the optical terminal 20 may conserve volume by using a dove prism 1212 to fold the optical design depicted in FIG. 12, so that the beam may be further manipulated in the space lying above the transmit/receive apertures 1201.

Figure 14:
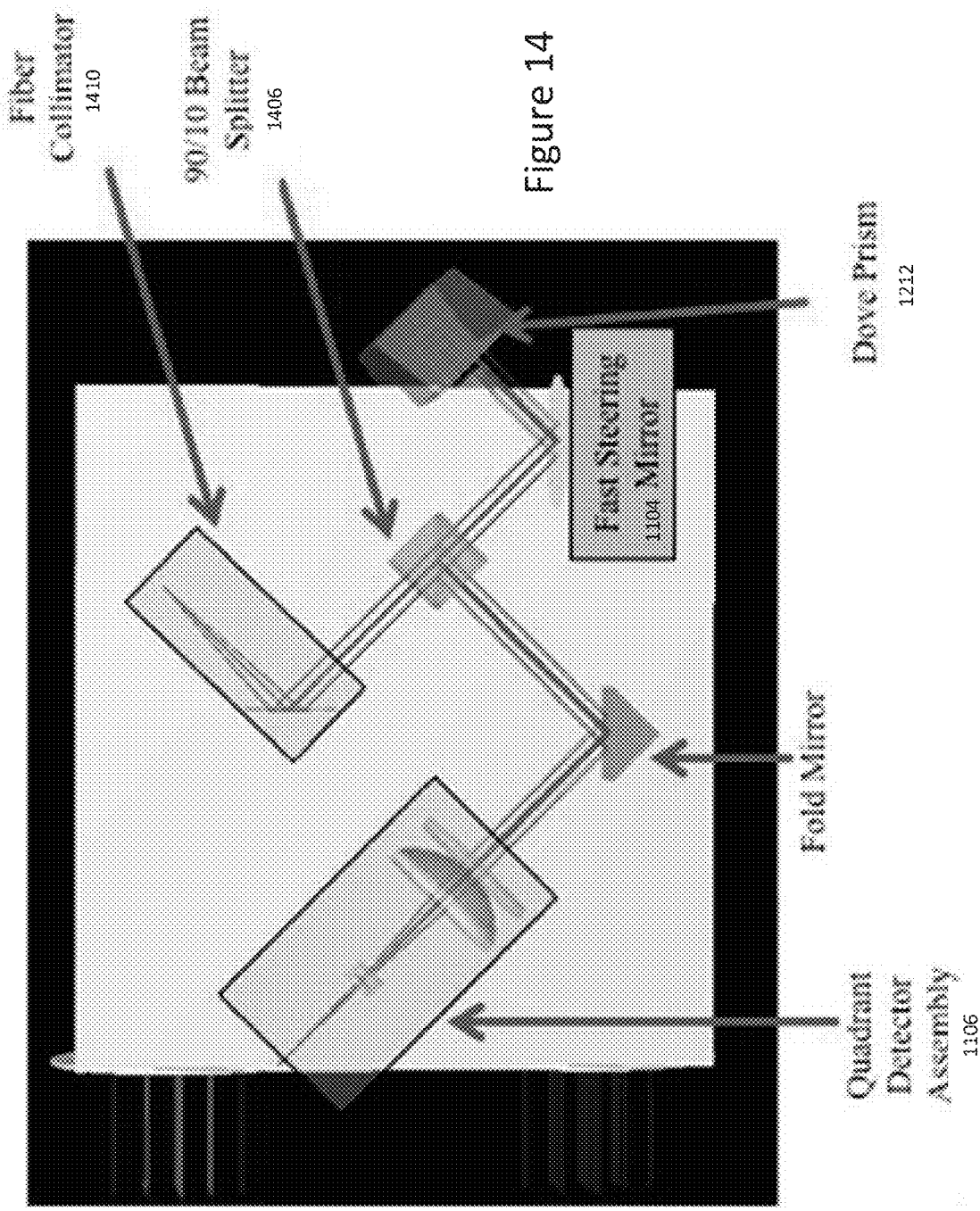
FIG. 14 illustrates a top level of the optical terminal according to an example embodiment.

FIG. 14 illustrates a top level of the optical terminal 20 according to an example embodiment. Once the beams are folded over by the dove prism 1212, the output beam reflects off of a FSM 1104 into non-polarizing beam splitter 1406, e.g. 80/20 beam splitter, 90/10 beam splitter, or the like. The non-polarizing beam splitter 1406 transmits the majority of the energy into the position sensing quadrant detector 1106 and transmits the rest of the energy into the OAP fiber collimator 1410. The quadrant detector 1106 may then be used in a feedback loop with the FSM 1104 to align the beam onto the fiber. The fiber may be operably coupled to a photo detector configured to receive optical data and communicate the optical data to a processor, such as processing circuitry 50.

In an example embodiment, in which a data link signal is to be transmitted, a light source may be operably coupled to the SMF, such as a laser. The light source may be in data communication with processing circuitry, such as processing circuitry 50, which may be configured to cause the light source to transmit a light beam including data. When the beam emerges from the SMF it may be collimated by the OAP fiber collimator 1410. The beam may travel the reverse path of the received beam until it reaches the polarizing beam splitter 1014. Depending on the polarization of the transmitted beam, the beam will then either traverse beam path A or beam path B where the beam will exit the optical terminal.

In some example embodiments, the optical terminal may be configured for use with a gimbal, such as Cloud Cap/UTC TASE400e micro-gimbal for UAV platforms or an MX-15i for larger platforms.

Example Received Power Analysis

Figure 15:
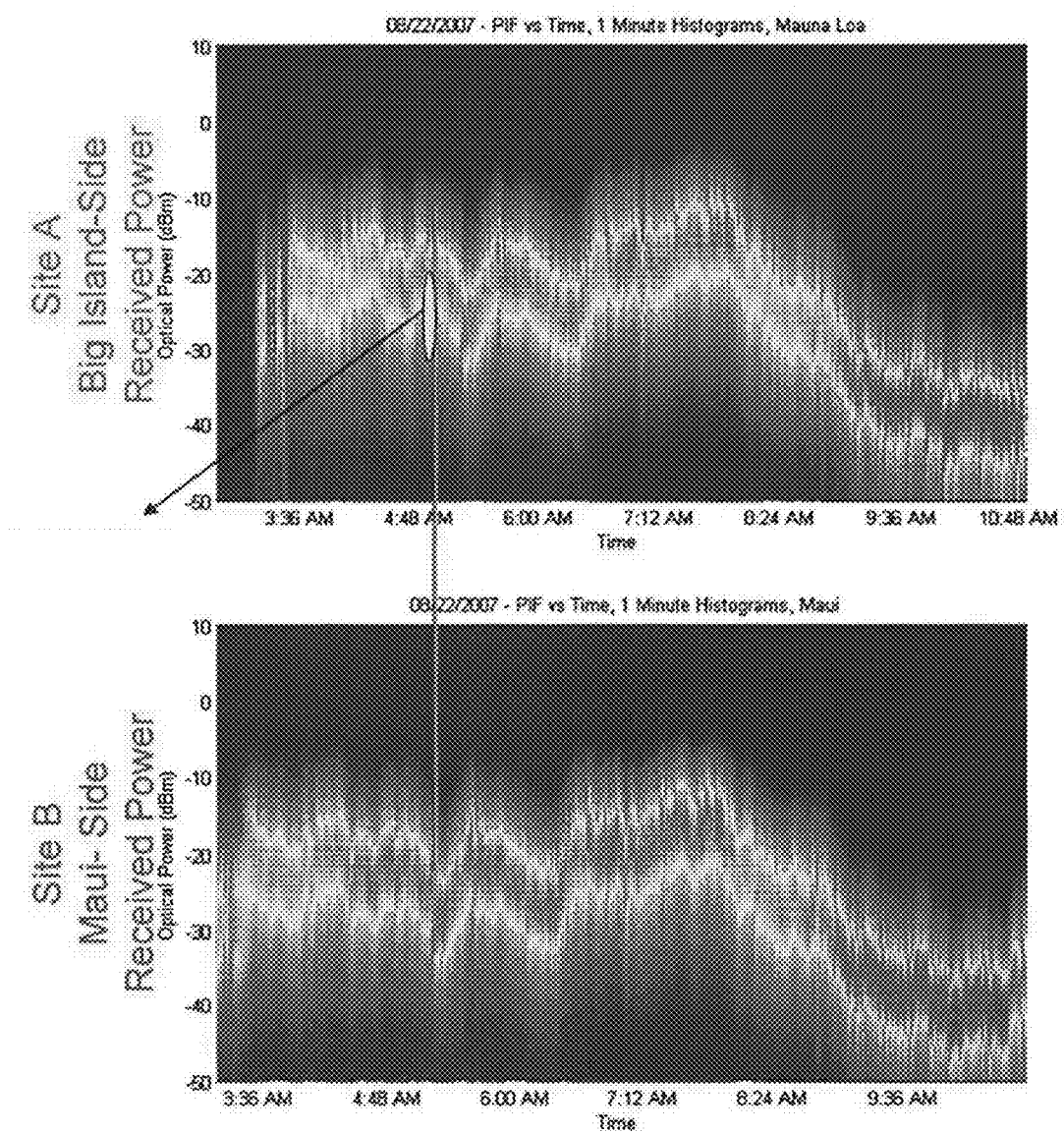
FIG. 15 illustrates a received power histogram according to an example embodiment.
Figure 16:
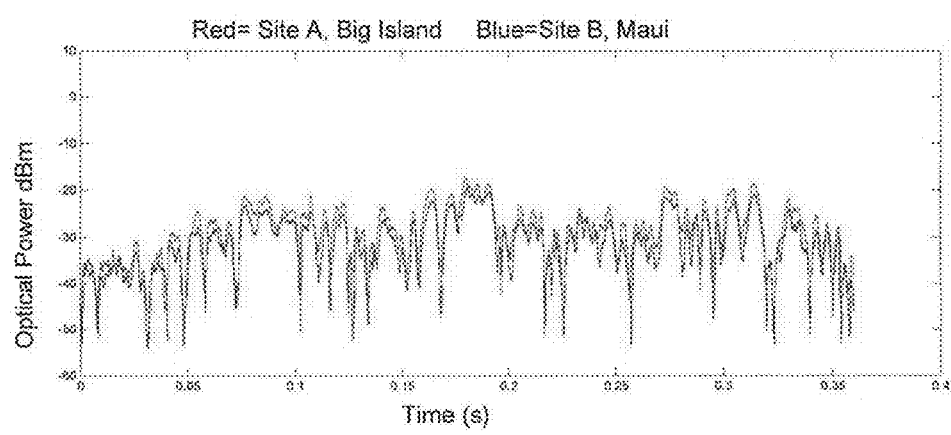
FIG. 16 illustrates data link end received power comparison according to an example embodiment.

FIG. 15 illustrates a received power histogram according to an example embodiment. An hourly plot of optical received power data over a 150-km FSOC bi-directional link, e.g. data link 12, is depicted for site 1 and site 2. The power on each side of data link 12 is essentially identical. Unlike RF propagation where local reflection points result in different multipath fade power profiles at each site, in the example FSOC, the beam is confined so the resultant power on each side is identical.

The intensity of the plot indicates the amount of time the power was at a given level, with brighter colors indicating a longer time. The hourly data from each site appears quite similar. While there are a few differences, these may be traced to changes introduced done by human interventions to the test set. The plots show qualitatively that the power received from one site compared to the power received from the other site of the data link 12 experience similar fading.

The optical power of each end of the data link 12 was sampled at a rate of 10 kilosamples per second. A finer time scale presented in FIG. 16, reveals quantitatively that the data is identical, on the same time scale, as the dynamic fades. While there are several dB differences, which may be due to non-simultaneous sampling at each data link 12 end and/or differences in sampling units between calibrations of the collected optical power data. For practical purposes, the power versus time on each side of the data link 12 is identical.

The optical power comparison demonstrates that a metric exists at the transmitting side of a data link 12 that indicates the quality of reception to the remote side of the data link 12. If a fade occurs in the received power at transmitter site A, a similar fade may occur in the data being received at site B. In other words, the conditions on both ends of the data link 12 are highly correlated when the beam paths are counter-propagating along a common path.

This channel reciprocity can be leveraged with a multi-aperture system such as the one described above. The received power on each aperture can be monitored with a low-frequency detector to estimate the likelihood that the opposite end of the link is in a faded condition. If optical terminals 20 work cooperatively, when conditions are faded on both receive apertures, by being able to switch the transmit apertures (by changing polarization state of outgoing light), the optical terminals 20 can further decrease the probability that they are in faded conditions. For example, if both optical terminals 20 (e.g. A and B of the depicted example) are emitting a data link 12 on their top aperture as long as they are receiving enough power on any one aperture, the optical terminals 20 would maintain their emission condition. As soon as both apertures fall below a pre-set threshold, the optical terminals 20 each can quickly change their emission aperture to the bottom aperture. This would change the exact transmission path between the optical terminals 20 and thus decrease the likelihood that the power level would remain faded. Alternatively, rather than having a binary state between top and bottom launch conditions, both apertures can be set to emit with the power ratio favoring the aperture receiving the most power. This, in essence, selects the transmission path that is least faded.

Example Optical Communication Platform

Figure 17:
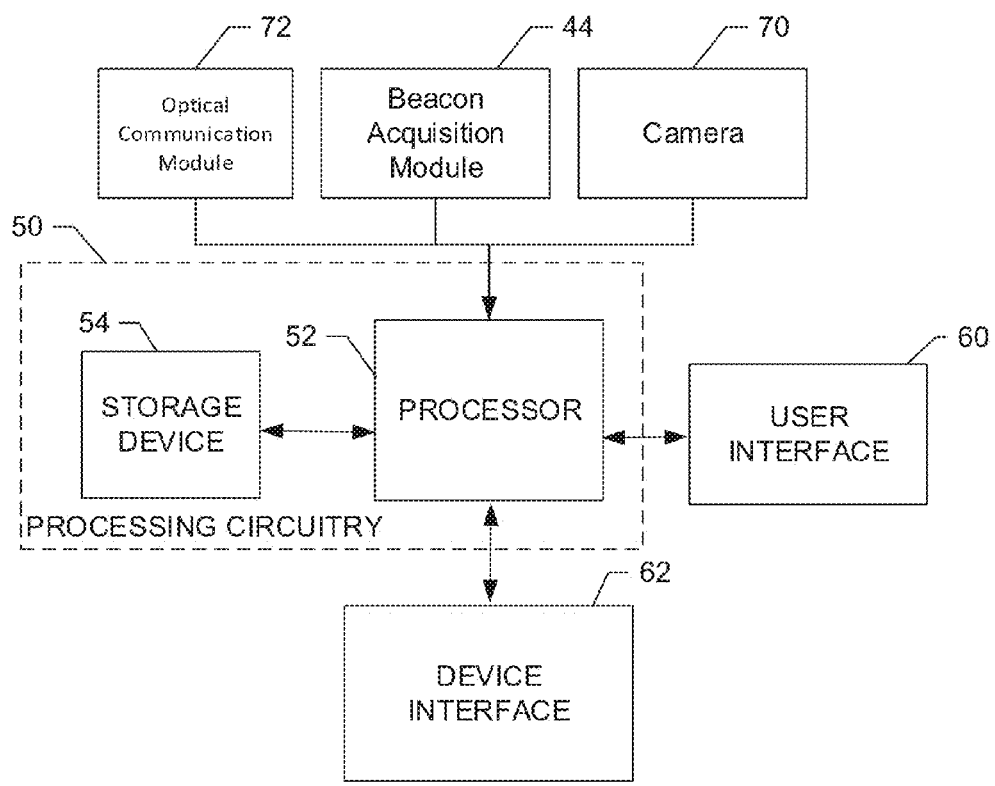
FIG. 17 illustrates an example FSOC system according to an example embodiment.

FIG. 17 shows certain elements of the FSOC platforms 10 according to an example embodiment. Some embodiments of the present optical communication platform may be embodied wholly at a single device or by devices (e.g., the optical terminal 20, the beacon transmitter 200 and/or the beacon receiver 300). Furthermore, it should be noted that the devices or elements described below may not be mandatory and thus some may be omitted in certain embodiments.

In an example embodiment, the optical communication platform may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device) that may be in communication with the processing circuitry 50 via the device interface 62 and/or a network.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN).

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., a database server) that may store a variety of files, contents, or data sets. Among the contents of the storage device 54, applications may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control a beacon acquisition module 44, which may be any means, such as, a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the beacon acquisition module 44 as described below.

The beacon acquisition module 44 may include tools to facilitate determination of the beacon location. In an example embodiment the beacon acquisition module 44 may be configured for receiving a plurality of beacon images from the camera 70, determining the state of the beacon for each of the plurality of images based on a known beacon pattern, wherein at least one image of the plurality of beacon images includes a beacon on state and at least one image of the plurality of beacon images includes an beacon off state, comparing the at least one beacon image including the beacon on state to the at least one beacon image including the beacon off state, and determining a beacon location based on the comparison of the at least one beacon image including the beacon on state to the at least one beacon image including the beacon off state.

In an example embodiment, the processing circuitry 50 may include or otherwise be in data communication with the camera 70. The camera 70 may be a visible light camera, an IR camera, a photo detector, or the like, configured to capture images of the area including the beacon signal 212. The camera 70 may be chosen based on the wavelength of the beacon signal 212.

In some example embodiments, the processing circuitry 50 may include or otherwise be in communication with an optical communication module 72. The optical communication module 72 may be configured to receive the optical data from a photo detector of the optical terminal 20. The processing circuitry 50 may cause the optical data to be displayed on the user interface 60 and/or cause the transmission of the optical data to other systems, via the device interface 62.

Example Distributed Graph Processing Flow Chart

Figure 18:
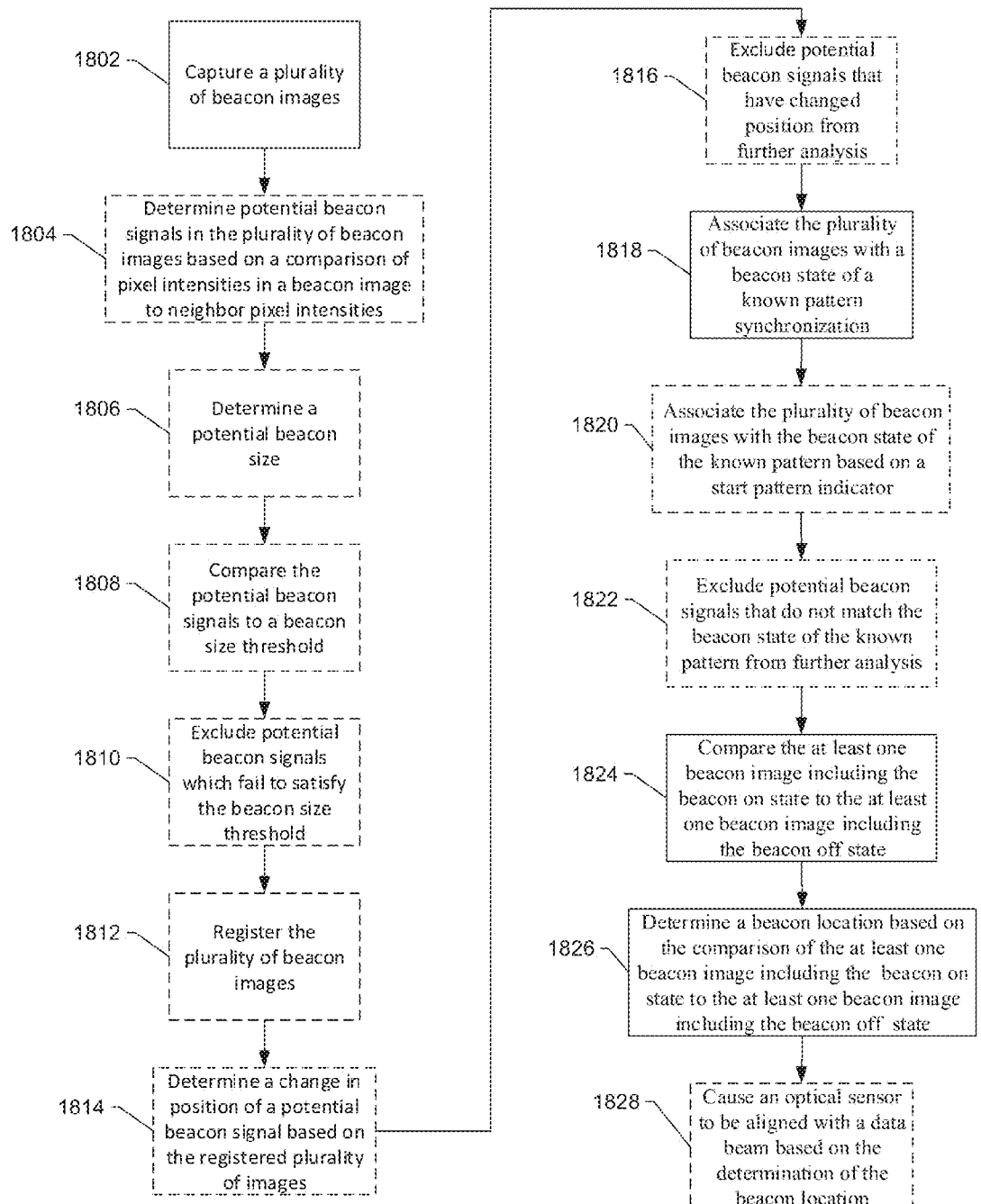
FIG. 18 illustrates a method for determining a beacon location according to an example embodiment.

From a technical perspective, the beacon acquisition module 44 described above may be used to support some or all of the operations described above. As such, the FSOC platform 10 described in FIG. 17 may be used to facilitate the implementation of several computer program and/or network communication based interactions. As an example, FIG. 18 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device, such as storage device 54 and executed by a processor in the FSOC platform, such as processor 52. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention is shown in FIG. 18. The method may be employed for FSOC platforms 10 for determining a beacon location. The method may include, capturing a plurality of beacon images, at operation 1802. The method may also include associating the plurality of beacon images with a beacon state of a known pattern, at operation 1818. At operation 1824, the method may include comparing at least one beacon image including the beacon on state to at least one beacon image including the beacon off state. The method, at operation 1826, may include determining a beacon location based on the comparison of the at least one beacon image including the beacon on state to the at least one beacon image including the beacon off state.

In an example embodiment, the method may optionally include, as denoted by the dashed boxes, determining potential beacon signals in the plurality of beacon images based on a comparison of pixel intensities in a beacon image to neighbor pixel intensities, at operation 1804. The method may also include determining a potential beacon size, at operation 1806, comparing the potential beacon signals to a beacon size threshold, at operation 1808, and excluding potential beacon signals that fail to satisfy the beacon size threshold, at operation 1810. In some example embodiments, the method may also include registering the plurality of beacon images at operation 1812, determining a change in position of a potential beacon signals based on the registered plurality of beacon images, at operation 1814, and excluding potential beacon signals that have changed position from further analysis, at operation 1816. The method may also include associating the plurality of beacon images with the beacon state the known pattern based on a start pattern indicator, at operation 1820 and excluding potential beacon signals that do not match the beacon state of the known pattern from further analysis, at operation 1822. In some example embodiments, the method may also include causing an optical sensor to be aligned with a data beam based on the determination of the beacon location, at operation 1828.

In an example embodiment, an apparatus for performing the method of FIG. 18 above may comprise a processor (e.g., the processor 52) or processing circuitry configured to perform some or each of the operations (1802-1828) described above. The processor may, for example, be configured to perform the operations (1802-1828) by performing hardware implemented logical functions, executing stored instructions, or executing algorithms for performing each of the operations. In some embodiments, the processor or processing circuitry may be further configured for additional operations or optional modifications to operations 1802-1828. In this regard, in an example embodiment, the processing circuitry is further configured to cause an optical sensor to be aligned with a data beam based on the determination of the beacon location. In some embodiments, the processing circuitry is further configured for determining potential beacon signals in the plurality of beacon images based on a comparison of pixel intensities in a beacon image to neighbor pixel intensities, and the comparison of the at least one beacon image including the beacon on state to the at least one beacon image including the beacon off state comprises a comparison of the potential beacon signals. In an example embodiment, the processing circuitry is further configured for determining a potential beacon size for the potential beacon signals, comparing the beacon sizes of the potential beacon signals to a beacon size threshold, and excluding potential beacon signals that fail to satisfy the beacon size threshold from further analysis. In some embodiments, the processing circuitry is further configured for registering the plurality of beacon images. In an example embodiment, the processing circuitry is further configured for determining a change in position of a potential beacon signal based on the registered plurality of beacon images and excluding potential beacon signals that have changed position from further analysis. In some embodiments, the beacon receiver is synchronized with the known pattern of the beacon transmitter. In an example embodiment, the processing circuitry is further configured for associating the plurality of images with the beacon state of the synchronized known pattern, and excluding potential beacon signals that do not match the beacon state of the synchronized known pattern from further analysis. In some embodiments, the known pattern comprises a repetitive pattern cycle and each pattern cycle includes a start pattern indicator. In an example embodiment, the processing circuitry is further configured for associating the plurality of beacon images with the beacon state of the known pattern based on the start pattern indicator and excluding potential beacon signals that do not match the beacon state of the beacon pattern from further analysis. In some embodiments, the beacon receiver further comprises a wavelength filter and the wavelength filter passes light in the wavelength range of the beacon signal and rejects light outside of the wavelength range of the beacon signal. In an example embodiment, the beacon receiver further comprises a polarization filter, the polarization filter is aligned with a polarization of the beacon signal, and the polarization filter passes light in the polarization of the beacon signal and rejects light not aligned with the polarization of the beacon signal. In some embodiments, the beacon transmitter comprises a first quarter wave plate to convert a linear polarization of the beacon signal into circular polarization. In an example embodiment, the beacon receiver further comprises a second quarter wave plate to convert the circular polarized beacon signal into linear polarization.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring device s are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An optical communications beacon receiver comprising:
    a camera for capturing a plurality of beacon images, wherein the plurality of beacon images include a beacon signal transmitted from a beacon transmitter, and
    processing circuitry configured for:
        determining a state of the beacon signal for each of the plurality of beacon images based on a known pattern, wherein at least one beacon image of the plurality of beacon images includes a beacon on state and at least one beacon image of the plurality of beacon images includes a beacon off state,
        comparing the at least one beacon image including the beacon on state to the at least one beacon image including the beacon off state to perform background subtraction and improve a signal-to-noise ratio for the beacon signal, and
        determining a location of the beacon transmitter in the plurality of beacon images based on the comparison of the at least one beacon image including the beacon on state to the at least one beacon image including the beacon off state, wherein the location of the beacon transmitter is used to align the beacon receiver with a data link beam transmitted from the beacon transmitter.

2. The beacon receiver of claim 1, wherein the processing circuitry is further configured for:
    causing an optical sensor to align with the data link beam based on the determination of the location of the beacon transmitter.

3. The beacon receiver of claim 1, wherein the processing circuitry is further configured for:
    determining potential beacon signals in the plurality of beacon images based on a comparison of pixel intensities in a beacon image to neighbor pixel intensities,
    wherein the comparison of the at least one beacon image including the beacon on state to the at least one beacon image including the beacon off state comprises a comparison of the potential beacon signals.

4. The beacon receiver of claim 3, wherein the processing circuitry is further configured for:
    determining a potential beacon size for the potential beacon signals;
    comparing the beacon sizes of the potential beacon signal to a beacon size threshold; and
    excluding potential beacon signals that fail to satisfy the beacon size threshold from further analysis.

5. The beacon receiver of claim 3, wherein the processing circuitry is further configured for:
    registering the plurality of beacon images.

6. The beacon receiver of claim 5, wherein the processing circuitry is further configured for:
    determining a change in position of a potential beacon based on the registered plurality of beacon images; and
    excluding potential beacon signals that have changed position from further analysis.

7. The beacon receiver of claim 3, wherein the beacon receiver is synchronized with the known pattern of the beacon transmitter.

8. The beacon receiver of claim 7, wherein the processing circuitry is further configured for:
    associating the plurality of beacon images with the beacon state of the known pattern, and
    excluding potential beacon signals that do not match the beacon state of the known pattern from further analysis.

9. The beacon receiver of claim 3, wherein the known pattern comprises a repetitive pattern cycle and each pattern cycle includes a start pattern indicator.

10. The beacon receiver of claim 9, wherein the processing circuitry is further configured for:
    associating the plurality of images with the beacon state of the known pattern based on the start pattern indicator, and
    excluding potential beacons that do not match the beacon state of the beacon pattern from further analysis.

11. The beacon receiver of claim 1, wherein the beacon receiver further comprises a wavelength filter,
    wherein the wavelength filter passes light in a wavelength range of the beacon signal and rejects light outside of the wavelength range of the beacon signal.

12. The beacon receiver of claim 1, wherein the beacon receiver further comprises a polarization filter,
    wherein the polarization filter is aligned with a polarization of the beacon signal,
    wherein the polarization filter passes light in the polarization of the beacon signal and rejects light not aligned with the polarization of the beacon signal.

13. The beacon receiver of claim 12, wherein the beacon transmitter comprises a first quarter wave plate to convert a linear polarization of the beacon signal into circular polarization.

14. The beacon receiver of claim 13, wherein the beacon receiver further comprises:
    a second quarter wave plate to convert the circular polarized beacon signal into linear polarization.

15. The beacon receiver of claim 14, wherein the first quarter wave plate of the beam transmitter and the second quarter wave plate of the beacon receiver are complementary.

16. An optical communication system comprising:
    a beacon transmitter configured to transmit a beacon signal in a known pattern; and
    a beacon receiver comprising:
        a camera for capturing a plurality of beacon images, and
        processing circuitry configured for:
            determining the state of the beacon signal for each of the plurality of beacon images based on the known pattern, wherein at least one beacon image of the plurality of beacon images includes a beacon on state and at least one beacon image of the plurality of beacon images includes a beacon off state,
            comparing the at least one beacon image including the beacon on state to the at least one beacon image including the beacon off state to perform background subtraction and improve a signal-to-noise ratio for the beacon signal, and
            determining a location of the beacon transmitter in the plurality of beacon images based on the comparison of the at least one beacon image including the beacon on state to the at least one beacon image including the beacon off state, wherein the location of the beacon transmitter is used to align the beacon receiver with a data link beam transmitted from the beacon transmitter.

17. The optical communication system of claim 16, wherein the processing circuitry is further configured to steer an optical sensor to align with the data link beam based on the determination of the location of the beacon transmitter.

18. The optical communication system of claim 16, wherein the processing circuitry is further configured for:
   determining potential beacon signals in the plurality of beacon images based on a comparison of pixel intensities in a beacon image to neighbor pixel intensities, wherein the comparison of the at least one beacon image including the beacon on state to the at least one beacon image including the beacon off state comprises a comparison of the potential beacon signals.

19. The optical communication system of claim 18, wherein the beacon receiver is synchronized with the known pattern of the beacon transmitter or wherein the known pattern comprises a repetitive pattern cycle and each pattern cycle includes a start pattern indicator.

20. The optical communication system of claim 19, wherein the processing circuitry is further configured for:
   associating the plurality of beacon images with the beacon state of the known pattern based on the synchronization or start pattern indicator, and
   excluding potential beacon signals that do not match the beacon state of the known pattern from further analysis.

\* \* \* \* \*